US009292117B2

(12) United States Patent
Kim et al.

(10) Patent No.: US 9,292,117 B2
(45) Date of Patent: Mar. 22, 2016

(54) TOUCH SENSING DEVICE AND METHOD FOR DRIVING THE SAME

(71) Applicant: LG DISPLAY CO., LTD., Seoul (KR)

(72) Inventors: Sungchul Kim, Paju-si (KR); Junghan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 109 days.

(21) Appl. No.: 13/712,753

(22) Filed: Dec. 12, 2012

(65) Prior Publication Data
US 2013/0314342 A1 Nov. 28, 2013

(30) Foreign Application Priority Data

May 25, 2012 (KR) .................. 10-2012-0056388

(51) Int. Cl.
G06F 3/041 (2006.01)
G06F 3/044 (2006.01)

(52) U.S. Cl.
CPC ............... *G06F 3/041* (2013.01); *G06F 3/044* (2013.01); *G06F 3/0416* (2013.01)

(58) Field of Classification Search
None
See application file for complete search history.

(56) References Cited

U.S. PATENT DOCUMENTS

2010/0253638 A1* 10/2010 Yousefpor et al. ............ 345/173
2012/0050220 A1    3/2012 Liu
2013/0076648 A1*  3/2013 Krah et al. .................... 345/173

FOREIGN PATENT DOCUMENTS

TW           201209658 A1    3/2012

* cited by examiner

Primary Examiner — Nicholas Lee
Assistant Examiner — Duane N Taylor, Jr.
(74) Attorney, Agent, or Firm — Fenwick & West LLP

(57) ABSTRACT

A touch sensing device includes a touch screen coupled with a display panel including data lines, gate lines crossing the data lines, and pixels arranged in a matrix form, and a touch sensing circuit which supplies a driving signal to lines of the touch screen and senses a touch input. The touch sensing circuit detects an optimum sensing time, in which changes in a voltage change of the gate lines are maintained within a previously determined allowable range, in a touch screen drive period in which data is not written to the pixels of the display panel. The touch sensing circuit supplies the driving signal to the lines of the touch screen only in the optimum sensing time of the touch screen drive period.

18 Claims, 11 Drawing Sheets

TOUCH SENSING DEVICE AND METHOD FOR DRIVING THE SAME

This application claims the benefit of Korean Patent Application No. 10-2012-0056388 filed on May 25, 2012, the entire contents of which is incorporated herein by reference for all purposes as if fully set forth herein.

BACKGROUND OF THE INVENTION

1. Field of the Invention

Embodiments of the invention relate to a touch sensing device coupled with a display device and a method for driving the same.

2. Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technologies have continuously evolved to increase user's sensibility and handling convenience. The user interface has been recently developed to touch UI, voice recognition UI, 3D UI, etc., and the touch UI has been basically installed in portable information devices. A touch screen is installed on a display panel of household appliances or the portable information devices, so as to implement the touch UI.

A capacitive touch screen has greater durability and definition than an existing resistive touch screen and is able to carry out multi-touch recognition and proximity-touch recognition. Hence, the capacitive touch screen may be applied to various applications. Because the capacitive touch screen is attached to the display panel or is embedded in the display panel, the capacitive touch screen is electrically coupled with the display panel. The display panel and the touch screen may be time-division driven in a display panel drive period and a touch screen drive period. Because a data voltage having a relatively large swing width is supplied to data lines of the display panel in the display panel drive period, a load of the display panel increases.

A current path between an output channel of a data driving circuit and the data lines of the display panel is cut off during the touch screen drive period. Hence, the data lines are floated, and are in a high impedance state or are held at DC voltage. Thus, the load of the display panel during the touch screen drive period is less than the load of the display panel during the display panel drive period. During the display panel drive period, a gate pulse (or scan pulse), which swings between a gate high voltage and a gate low voltage, is supplied to gate lines (or scan lines) of the display panel. During the touch screen drive period, the gate lines of the display panel may be held at the DC voltage, for example, the gate low voltage.

The gate low voltage supplied to the gate lines of the display panel changes because of a load difference between the display panel drive period and the touch screen drive period. For example, when the gate low voltage supplied to the gate lines of the display panel is −10V in the touch screen drive period, the gate low voltage of the gate lines is measured to almost −10V because the load of the display panel is small in the touch screen drive period. On the other hand, when the gate low voltage supplied to the gate lines of the display panel is −10V in the display panel drive period, the gate low voltage measured in the gate lines increases to almost −8V because of the large load of the display panel.

The gate low voltage supplied to the gate lines of the display panel may greatly change in a period, which changes from the display panel drive period to the touch screen drive period and vice versa, because of the load difference between the display panel drive period and the touch screen drive period. When the gate low voltage greatly changes, a noise of a voltage sensed from the touch screen greatly changes due to electrical coupling between the touch screen and the display panel. The noise reduces the sensing sensitivity of the touch screen.

SUMMARY OF THE INVENTION

Embodiments of the invention provide a touch sensing device and a method for driving the same capable of reducing a noise of a touch screen.

In one aspect, there is a touch sensing device including a touch screen coupled with a display panel including data lines, gate lines crossing the data lines, and pixels arranged in a matrix form, and a touch sensing circuit configured to supply a driving signal to lines of the touch screen and sense a touch input.

The touch sensing circuit detects an optimum sensing time, in which a voltage change of the gate lines are maintained within a previously determined allowable range, in a touch screen drive period in which data is not written to the pixels of the display panel. The touch sensing circuit supplies the driving signal to the lines of the touch screen only in the optimum sensing time of the touch screen drive period.

The touch sensing device further includes a controller configured to time-divide one frame period into a display panel drive period and the touch screen drive period and control a display panel driving circuit and the touch sensing circuit.

The display panel driving circuit writes data to the pixels of the display panel during the display panel drive period.

The touch sensing circuit counts sync signals received from the controller and detects the optimum sensing time based on a count value. Alternatively, the touch sensing circuit detects the voltage of the gate lines and detects the optimum sensing time based on changes in the detected voltage.

The optimum sensing time ranges from a time, at which a first transition period has passed from a start time point of the touch screen drive period, to a time which is advanced from an end time point of the touch screen drive period by a second transition period.

A ripple of a voltage measured in the gate lines during the optimum sensing time is less than a ripple of a voltage measured in the gate lines during the first and second transition periods.

In another aspect, there is a method for driving a touch sensing device including a touch screen coupled with a display panel including data lines, gate lines crossing the data lines, and pixels arranged in a matrix form, the method including setting a touch screen drive period, in which data is not written to the pixels of the display panel, detecting an optimum sensing time, in which a voltage change of the gate lines are maintained within a previously determined allowable range, in the touch screen drive period, and supplying a driving signal to lines of the touch screen only in the optimum sensing time of the touch screen drive period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A display device according to an example embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

Figure 1:
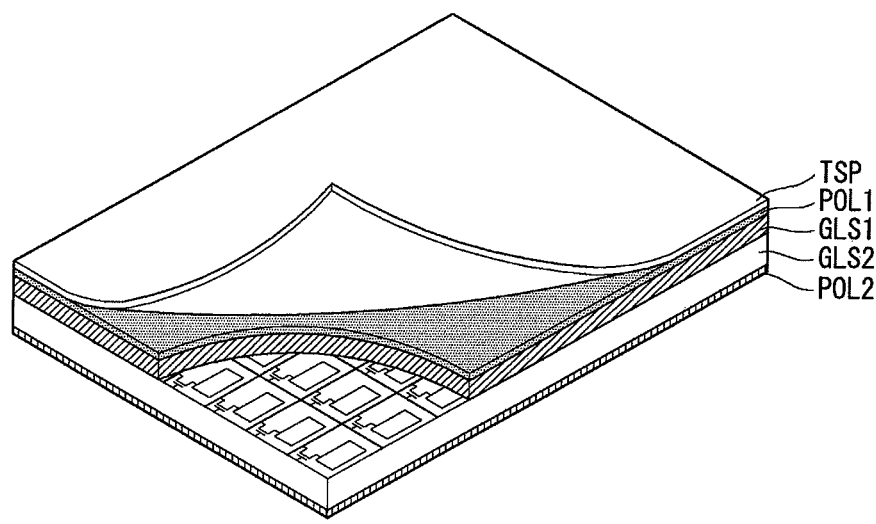
FIGS. 1 to 3 illustrate various combinations of a touch screen and a display panel according to an example embodiment of the invention.
Figure 2:
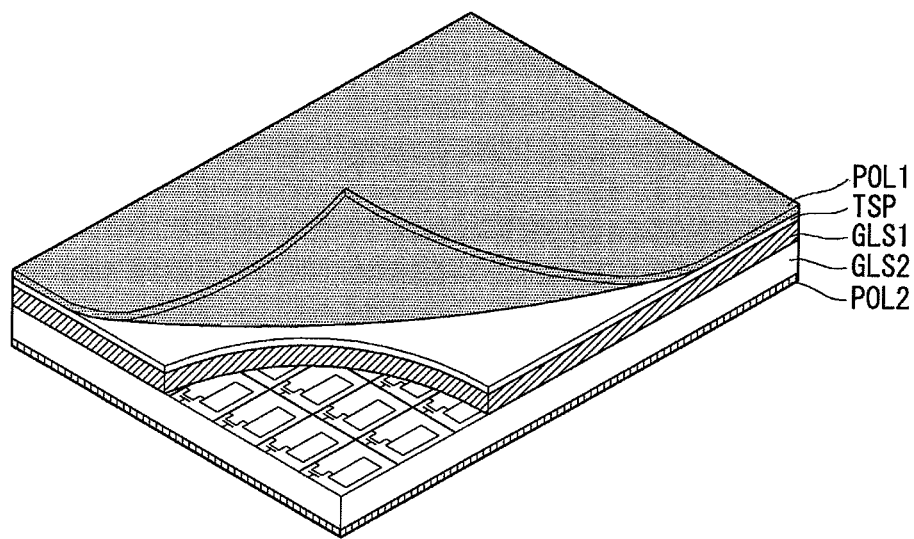
Figure 3:
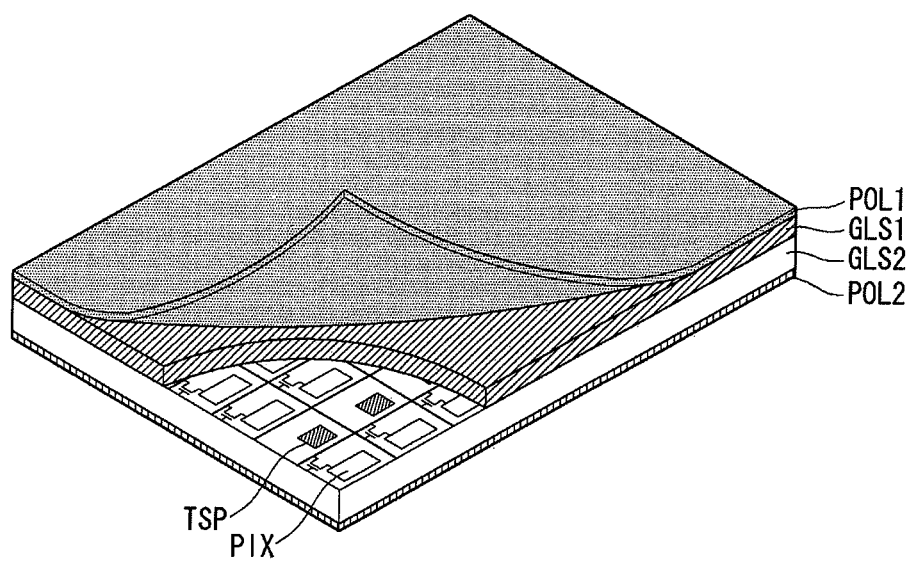

A touch screen TSP may be installed in the display device according to the embodiment of the invention using methods shown in FIGS. 1 to 3. As shown in FIG. 1, the touch screen TSP may be attached on an upper polarizing film POL1 of a display panel. Alternatively, as shown in FIG. 2, the touch screen TSP may be formed between the upper polarizing film POL1 and an upper substrate GLS1. Alternatively, as shown in FIG. 3, capacitive touch sensors of the touch screen TSP may be embedded in a pixel array of the display panel. In FIGS. 1 to 3, 'PIX' denotes a pixel electrode of a pixel, 'GLS2' denotes a lower substrate, and 'POL2' denotes a lower polarizing film.

The touch screen TSP may be implemented as a capacitive touch screen which senses a touch (or proximity) input through a plurality of capacitive sensors. The capacitive touch screen is classified into a self-capacitive touch screen and a mutual capacitive touch screen. The self-capacitive touch screen is formed along a conductor line of a single-layered structure formed in one direction. The mutual capacitive touch screen is formed between two conductor lines which are orthogonal to each other.

Figure 4:
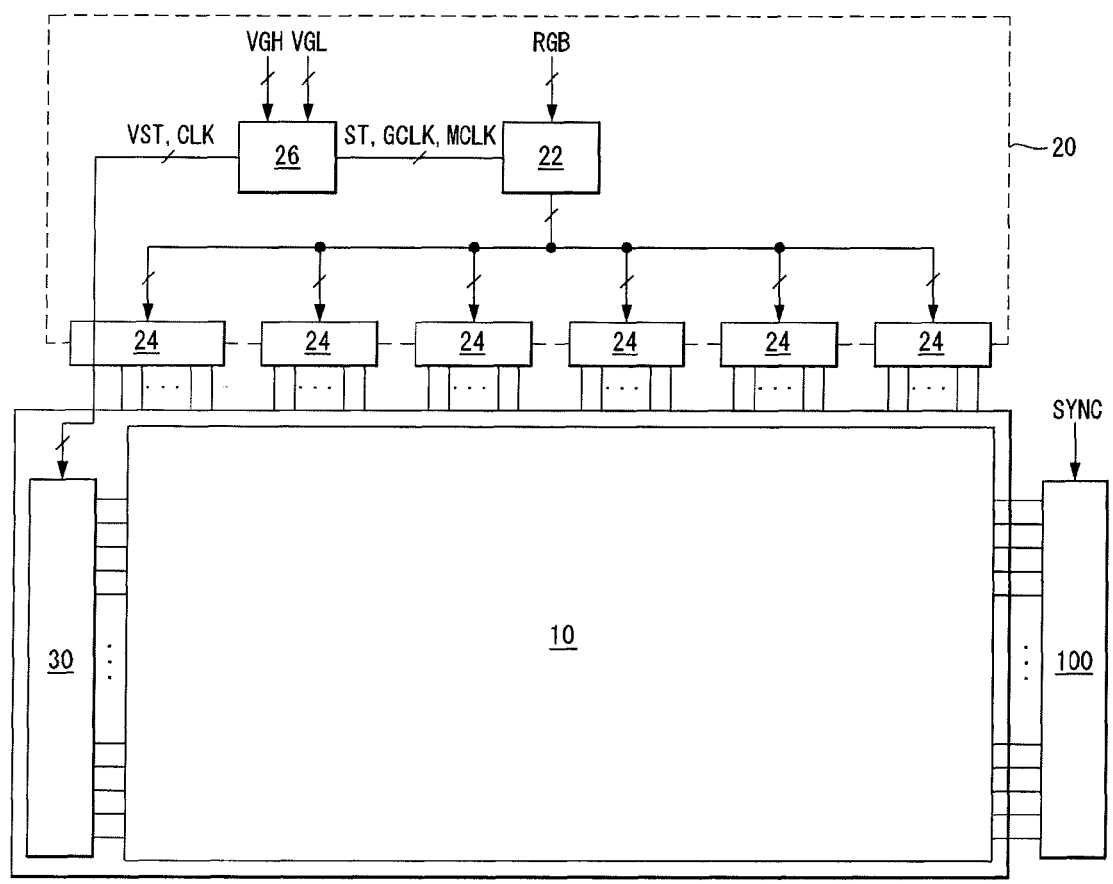
FIG. 4 is a block diagram of a display device according to an example embodiment of the invention.
Figure 5:
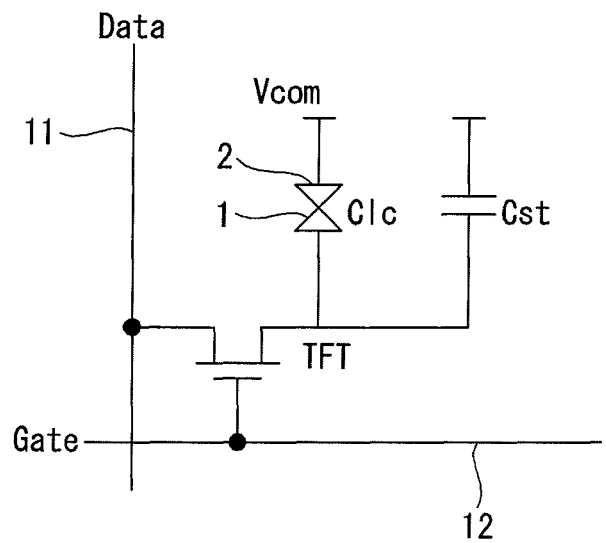
FIG. 5 is an equivalent circuit diagram of a liquid crystal cell.

As shown in FIGS. 4 and 5, the display device according to the embodiment of the invention includes a display panel 10, a display panel driving circuit, a timing controller 22, a touch sensing circuit 100, etc. All components of the display device are operatively coupled and configured.

The display panel 10 includes a lower substrate, an upper substrate, and a liquid crystal layer formed between the lower substrate and the upper substrate. The upper and lower substrates may be manufactured using glass, plastic, film, etc. A pixel array formed on the lower substrate of the display panel 10 includes a plurality of data lines 11, a plurality of gate lines (or scan lines) 12 orthogonal to the data lines 11, and a plurality of pixels arranged in a matrix form. The pixel array further includes a plurality of thin film transistors (TFTs) formed at crossings of the data lines 11 and the gate lines 12, a plurality of pixel electrodes 1 for charging the pixels to a data voltage, a plurality of storage capacitors, each of which is connected to the pixel electrode 1 and holds a voltage of the pixel, etc.

The pixels of the display panel 10 are arranged in a matrix form defined by the data lines 11 and the gate lines 12. A liquid crystal cell of each pixel is driven by an electric field generated depending on a voltage difference between the data voltage supplied to the pixel electrode 1 and a common voltage supplied to a common electrode 2, thereby adjusting an amount of incident light transmitted by the liquid crystal cell. Each of the TFTs is turned on in response to a gate pulse (or a scan pulse) from the gate line 11, thereby supplying the data voltage from the data line 11 to the pixel electrode 1 of the liquid crystal cell. The common electrode 2 may be formed on the lower substrate or the upper substrate of the display panel 10.

The upper substrate of the display panel 10 may include black matrixes, color filters, etc. Polarizing films are respectively attached to the upper and lower substrates of the display panel 10. Alignment layers for setting a pre-tilt angle of liquid crystals are respectively formed on the inner surfaces contacting the liquid crystals in the upper and lower substrates of the display panel 10. A column spacer may be formed between the upper and lower substrates of the display panel 10 to keep a cell gap of the liquid crystal cells constant.

The display panel 10 may be implemented in any known mode including a twisted nematic (TN) mode, a vertical alignment (VA) mode, an in-plane switching (IPS) mode, a fringe field switching (FFS) mode, etc. A backlight unit may be disposed in a back space of the display panel 10. The backlight unit may be configured as one of an edge type backlight unit and a direct type backlight unit to provide light to the display panel 10.

The display panel driving circuit writes data of an input image to the pixels of the display panel 10 using a data driving circuit 24 and gate driving circuits 26 and 30.

The data driving circuit 24 converts digital video data RGB received from the timing controller 22 into positive and negative analog gamma compensation voltages to generate the data voltage. The data driving circuit 24 then supplies the data voltage to the data lines 11 and inverts a polarity of the data voltage under the control of the timing controller 22.

The gate driving circuits 26 and 30 sequentially supply the gate pulse synchronized with the data voltage to the gate lines 12 and select lines of the display panel 10 to which the data voltage will be applied. The gate driving circuits 26 and 30 include a level shifter 26 and a shift register 30. The shift register 30 may be directly formed on the substrate of the display panel 10 with the development of a gate in panel (GIP) process technology.

The level shifter 26 may be formed on a printed circuit board (PCB) 20 electrically connected to the lower substrate of the display panel 10. The level shifter 26 outputs a start pulse VST and clock signals CLK, which swing between a gate high voltage VGH and a gate low voltage VGL, under the control of the timing controller 22. The gate high voltage VGH is set to be greater than a threshold voltage of the TFT included in the pixel array of the display panel 10. The gate low voltage VGL is set to be less than the threshold voltage of the TFT. The level shifter 26 outputs the start pulse VST and the clock signals CLK, which swing between the gate high voltage VGH and the gate low voltage VGL, in response to a start pulse ST, a first clock GCLK, and a second clock MCLK which are received from the timing controller 22. Phases of the clock signals CLK output from the level shifter 26 are sequentially shifted and are transmitted to the shift register 30 on the display panel 10.

The shift register 30 is formed at an edge of the lower substrate of the display panel 10, on which the pixel array is formed, so that it is connected to the gate lines 12 of the pixel array. The shift register 30 includes a plurality of cascade-connected stages. The shift register 30 starts to operate in response to the start pulse VST received from the level shifter 26 and shifts its output in response to the clock signals CLK received from the level shifter 26. The shift register 30 sequentially supplies the gate pulse to the gate lines 12 of the display panel 10.

The timing controller 22 supplies the digital video data RGB received from an external host system to integrated circuits (ICs) of the data driving circuit 24. The timing controller 22 receives timing signals, such as a vertical sync signal Vsync, a horizontal sync signal Hsync, a data enable DE, and a clock, from the host system and generates timing control signals for controlling operation timings of the data driving circuit 24 and the gate driving circuits 26 and 30. The timing controller 22 or the host system generates a sync signal SYNC for controlling operation timings of the display panel driving circuit and the touch sensing circuit 100.

The touch sensing circuit 100 applies a driving signal to lines connected to the capacitive sensors of the touch screen TSP and counts changes in voltage of the driving signal before and after a touch operation or a delay time of a rising or falling edge of the driving signal, thereby sensing changes in the capacitance of the touch screen TSP before and after a touch (or proximity) input. The touch sensing circuit 100 converts the voltage received from the capacitive sensors of the touch screen TSP into digital data to generate touch raw data. The touch sensing circuit 100 performs a previously determined touch recognition algorithm and analyzes the touch raw data, thereby detecting the touch (or proximity) input. The touch sensing circuit 100 transmits touch report data including coordinates of a position of the touch (or proximity) input to the host system.

The host system may be implemented as one of a navigation system, a set-top box, a DVD player, a Blu-ray player, a personal computer (PC), a home theater system, a broadcasting receiver, and a phone system. The host system converts digital video data of the input image into a data format suitable for a resolution of the display panel 10 using a scaler and transmits the converted data and the timing signals to the timing controller 22. The host system runs an application associated with the touch (or proximity) input in response to the touch report data received from the touch sensing circuit 100.

Figure 6:
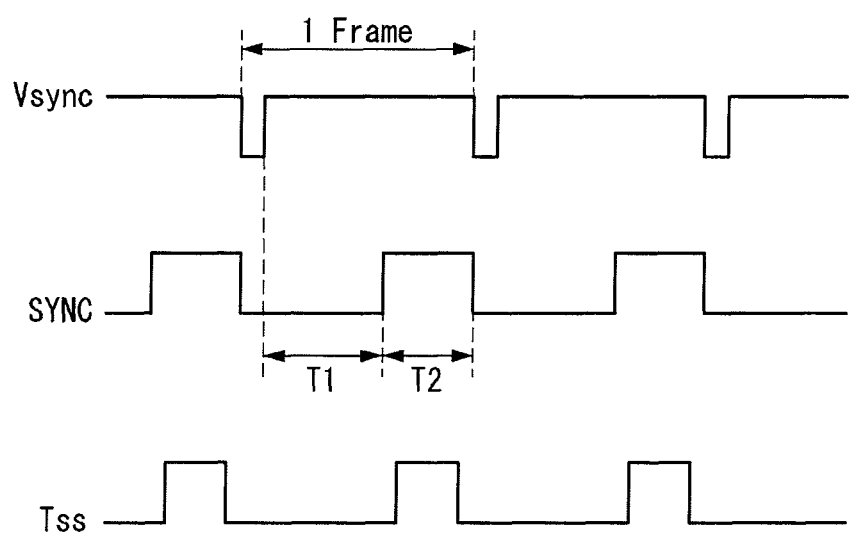
FIG. 6 is a waveform diagram of a vertical sync signal showing a time-division driving method of a display panel and a touch screen.

The display panel 10 and the touch screen TSP may be time-division driven using a method illustrated in FIG. 6. As shown in FIG. 6, one frame period may be time-divided into a display panel drive period T1 and a touch screen drive period T2.

In FIG. 6, 'Vsync' is a first vertical sync signal input to the timing controller 22, and 'SYNC' is a second vertical sync signal input to the touch sensing circuit 100. The timing controller 22 may modulate the first vertical sync signal Vsync received from the host system and generate the second vertical sync signal SYNC, so as to define the display panel drive period T1 and the touch screen drive period T2 in one frame period. In another embodiment, the host system may generate the second vertical sync signal SYNC shown in FIG. 6, and the timing controller 22 may control the display panel drive period T1 and the touch screen drive period T2 in response to the second vertical sync signal SYNC received from the host system. Thus, in the embodiment of the invention, a controller, which time-divides one frame period into the display panel drive period T1 and the touch screen drive period T2 and controls the operation timings of the display panel driving circuit and the touch sensing circuit 100, may one of the timing controller 22 and the host system.

A low logic level period of the second vertical sync signal SYNC may be defined as the display panel drive period T1, and a high logic level period of the second vertical sync signal SYNC may be defined as the touch screen drive period T2. However, the embodiment of the invention is not limited thereto. For example, the high logic level period of the second vertical sync signal SYNC may be defined as the display panel drive period T1, and the low logic level period of the second vertical sync signal SYNC may be defined as the touch screen drive period T2.

During the display panel drive period T1, the display panel driving circuit is driven, and the touch sensing circuit 100 is not driven. More specifically, during the display panel drive period T1, the data driving circuit 24 supplies the data voltage to the data lines 11, and the gate driving circuits 26 and 30 sequentially supply the gate pulse synchronized with the data voltage to the gate lines 12. The touch sensing circuit 100 does not supply the driving signal to the lines of the touch screen TSP during the display panel drive period T1. During the touch screen drive period T2, the display panel driving circuit is not driven, and the touch sensing circuit 100 is driven. The touch sensing circuit 100 detects an optimum sensing time Tss (refer to FIGS. 16 to 17B) in the touch screen drive period T2 and applies the driving signal to the lines of the touch screen TSP only during the optimum sensing time Tss. A voltage change of the gate lines 12 of the display panel 10 are maintained within a previously determined allowable range Ar2 (refer to FIGS. 17A and 17B). Thus, the touch sensing circuit 100 senses a change in a capacitive voltage of the touch screen TSP in the optimum sensing time Tss, in which a noise from the display panel 10 has a minimum value, thereby increasing the sensing sensitivity of the touch (or proximity) input. The lines of the touch screen TSP may be Tx lines (refer to FIG. 7) connected to mutual capacitive sensors shown in FIGS. 1 to 3 or sensing lines S1 to Sn (refer to FIG. 9) connected to self-capacitive sensors.

The touch screen TSP shown in FIG. 3, in which capacitances are embedded in the display panel 10 in an in-cell type, is more sensitively affected by changes in the load of the display panel 10 than the touch screen TSP shown in FIGS. 1 and 2. A line structure and a driving method of an in-cell type touch screen are described below.

Figure 7:
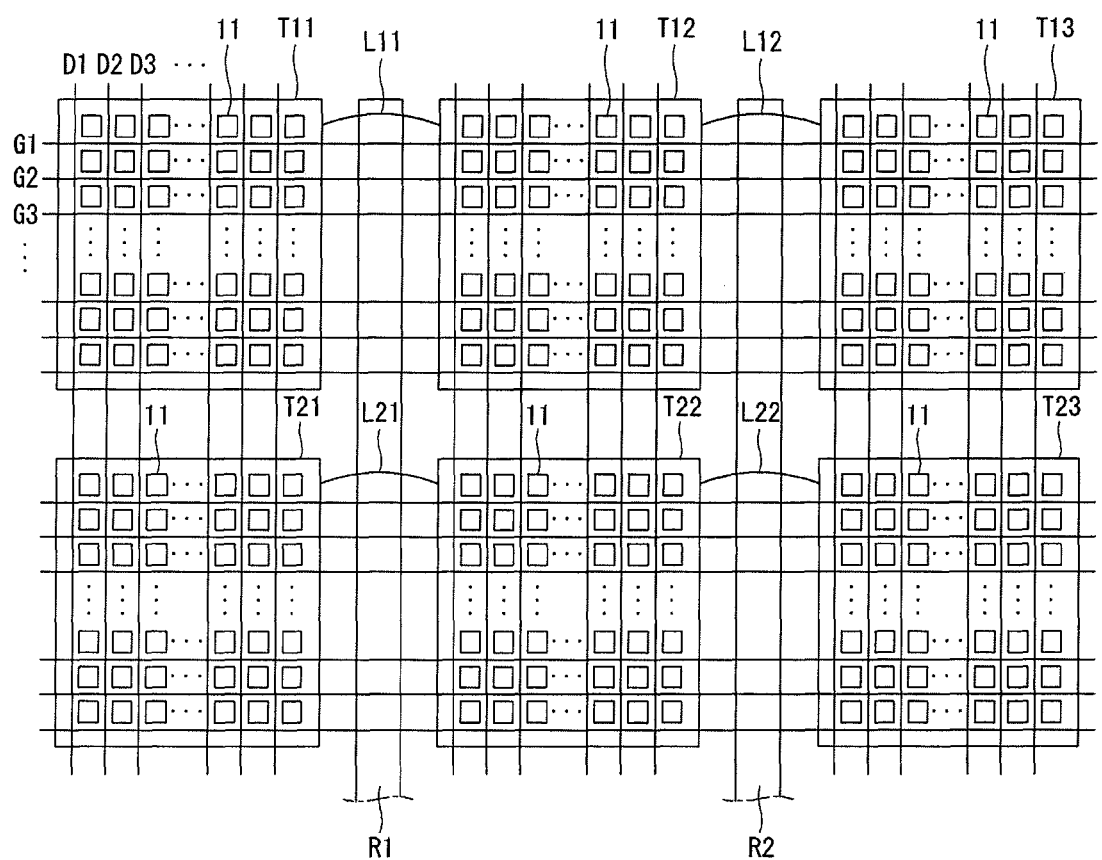
FIG. 7 is a plane view showing a line structure of a mutual capacitive touch screen which is embedded in a display panel in an in-cell type.
Figure 8:
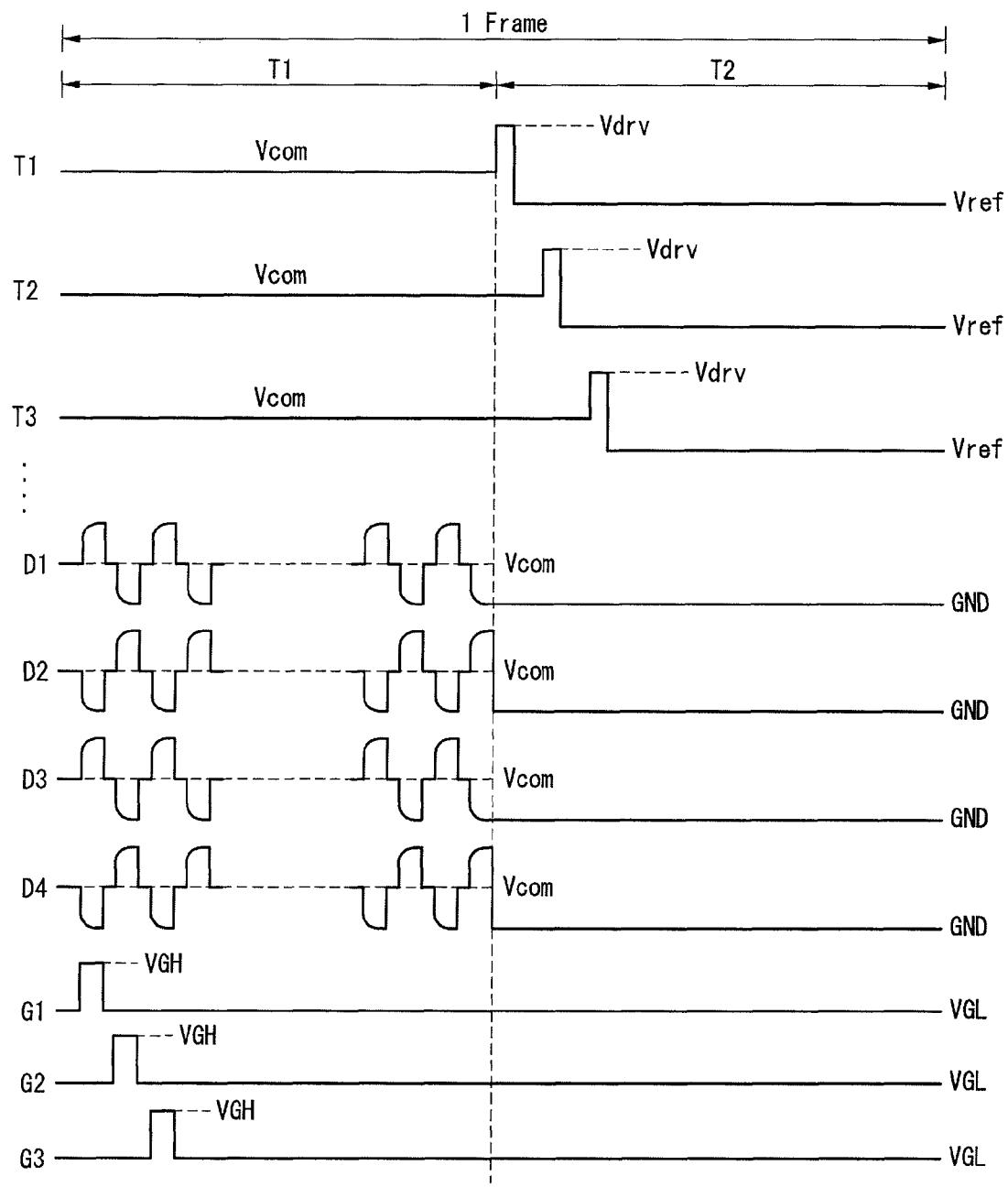
FIG. 8 is a waveform diagram showing an operation of a display device, in which the mutual capacitive touch screen shown in FIG. 7 is embedded.

FIGS. 7 and 8 illustrate a line structure and a driving method of a mutual capacitive touch screen. More specifically, FIG. 7 is a plane view showing a line structure of the mutual capacitive touch screen by enlarging the mutual capacitive touch screen, which is embedded in the display panel in the in-cell type, and a portion of the display panel. FIG. 8 is a waveform diagram showing an operation of the display device, in which the mutual capacitive touch screen shown in FIG. 7 is embedded.

As shown in FIGS. 7 and 8, the mutual capacitive touch screen TSP includes Tx lines and Rx lines R1 and R2 orthogonal to the Tx lines. A mutual capacitance is formed at each of crossings of the Tx lines and the Rx lines R1 and R2.

Each of the Tx lines includes a plurality of transparent conductive patterns which are connected to each other along a transverse direction (or a horizontal direction) of the display panel 10 through link patterns L11 to L22. For example, a first Tx line includes a plurality of transparent conductive patterns T11 to T13 which are connected to each other along the transverse direction of the display panel 10 through the link patterns L11 and L12. A second Tx line includes a plurality of transparent conductive patterns T21 to T23 which are connected to each other along the transverse direction through the link patterns L21 and L22. Each of the transparent conductive patterns T11 to T23 is patterned so that its size is greater than the size of the pixels, and thus overlaps the plurality of pixels. Each of the transparent conductive patterns T11 to T23 overlaps the pixel electrodes with an insulating layer interposed therebetween, and may be formed of a transparent conductive material, for example, indium tin oxide (ITO). Other materials may be used. The link patterns L11 to L22 electrically connect the transparent conductive patterns T11 to T23, which are adjacent to each other in the transverse direction, to one another across the Rx lines R1 and R2. The link patterns L11 to L22 may overlap the Rx lines R1 and R2 with an insulating layer interposed therebetween. The link patterns L11 to L22 may be formed of a metal with the high electrical conductivity, for example, aluminum (Al), aluminum neodymium (AlNd), molybdenum (Mo), chromium (Cr), copper (Cu), and silver (Ag), or a transparent conductive material. Other materials may be used. The transparent conductive patterns divided from the common electrode 2 may be used as Tx electrodes, to which the driving signal is applied.

The Rx lines R1 and R2 extend in a longitudinal direction (or a vertical direction) of the display panel 10, so that they are orthogonal to the Tx lines. The Rx lines R1 and R2 may be formed of a transparent conductive material, for example, indium tin oxide (ITO). Other materials may be used. Each of the Rx lines R1 and R2 may overlap the plurality of pixels (not shown). The Rx lines R1 and R2 may be formed on the upper substrate or the lower substrate of the display panel 10. For example, Rx electrodes may be formed on a front surface or a back surface of the upper substrate or the lower substrate of the display panel 10. In the in-cell type touch screen TSP shown in FIG. 3, the data lines of the pixel array may be used as the Rx electrodes, or the pixel array may include separate lines to be used as the Rx electrodes.

A common voltage source supplies a common voltage Vcom to the Tx lines T11 to T23 and L11 to L22 during the display panel drive period T1. Thus, the Tx lines T11 to T23 and L11 to L22 operate as the common electrode 2 during the display panel drive period T1.

The touch sensing circuit 100 is connected to the Tx lines T11 to T23 and L11 to L22 and the Rx lines R1 and R2. The touch sensing circuit 100 is disabled during the display panel drive period T1 and is enabled during the touch screen drive period T2. Hence, only during the touch screen drive period T2, the touch sensing circuit 100 sequentially supplies the driving signal to the Tx lines T11 to T23 and L11 to L22 and receives the voltages of the mutual capacitances through the Rx lines R1 and R2. The driving signal swings between a driving voltage Vdrv and a reference voltage Vref. In FIGS. 7 and 8, 'D1, D2, D3 . . . ' denote the data lines of the display panel 10, and 'G1, G2, G3 . . . ' denote the gate lines of the display panel 10.

The touch sensing circuit 100 samples the voltages of the mutual capacitances received through the Rx lines R1 and R2 and accumulates the sampled voltages to a capacitor of an integrator. The touch sensing circuit 100 converts a voltage charged to the capacitor of the integrator into digital data. The touch sensing circuit 100 compares the digital data with a previously determined threshold voltage and decides digital data equal to or greater than the threshold voltage as mutual capacitance data of a touch (or proximity) input position.

Figure 9:
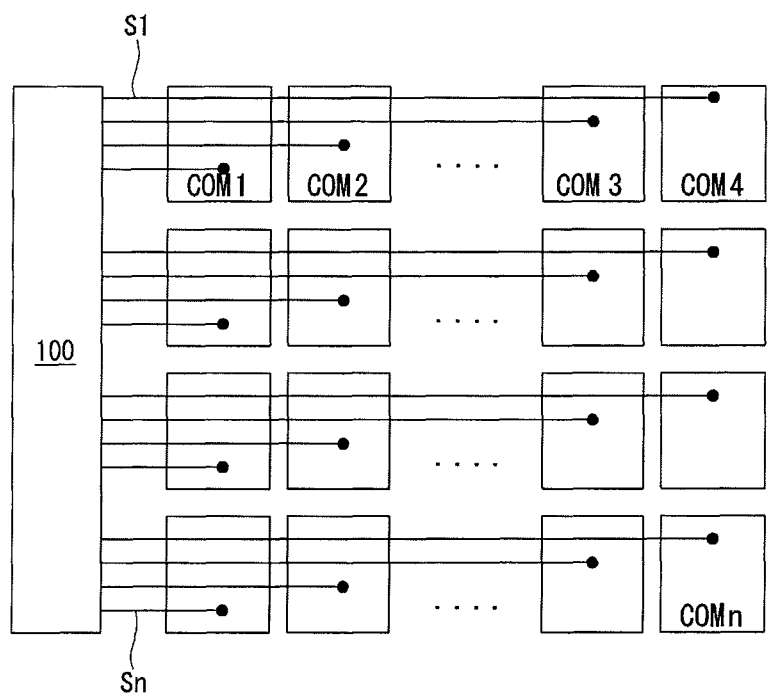
FIG. 9 is a plane view showing a line structure of a self-capacitive touch screen which is embedded in a display panel in an in-cell type.
Figure 10:
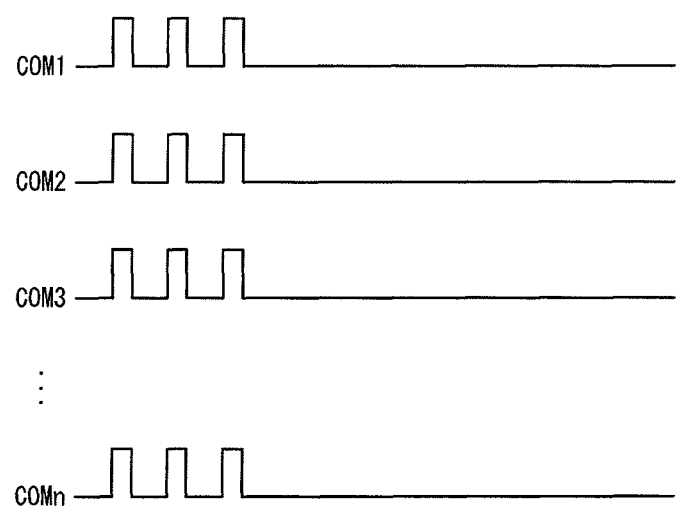
FIG. 10 is a waveform diagram showing a driving signal for sensing the self-capacitive touch screen shown in FIG. 9.

FIG. 9 is a plane view showing a line structure of a self-capacitive touch screen which is embedded in the display panel in the in-cell type. FIG. 10 is a waveform diagram showing a driving signal for sensing the self-capacitive touch screen shown in FIG. 9.

As shown in FIGS. 9 and 10, the self-capacitive touch screen TSP includes a plurality of transparent conductive patterns COM1 to COMn. Each of the transparent conductive patterns COM1 to COMn is patterned so that its size is greater than the size of the pixels, and thus overlaps the plurality of pixels. The transparent conductive patterns COM1 to COMn may be formed of a transparent conductive material. Other materials may be used. Each of the transparent conductive patterns COM1 to COMn is connected to a self-capacitance and is used as an electrode of the self-capacitance during the touch screen drive period T2.

The touch sensing circuit 100 may be connected to the transparent conductive patterns COM1 to COMn through sensing lines S1 to Sn on a one-to-one basis. The common voltage source (not shown) supplies the common voltage Vcom to the transparent conductive patterns COM1 to COMn through the sensing lines S1 to Sn during the display panel drive period T1. Thus, the transparent conductive patterns COM1 to COMn operate as the common electrode during the display panel drive period T1.

The touch sensing circuit 100 is disabled during the display panel drive period T1 and is enabled during the touch screen drive period T2. Hence, the touch sensing circuit 100 simultaneously supplies the driving signal shown in FIG. 10 to the sensing lines S1 to Sn only during the touch screen drive period T2. Although the display panel drive period T1 is not shown in FIG. 10, an operation of the display panel drive period T1 is substantially the same as FIG. 8.

Figure 11:
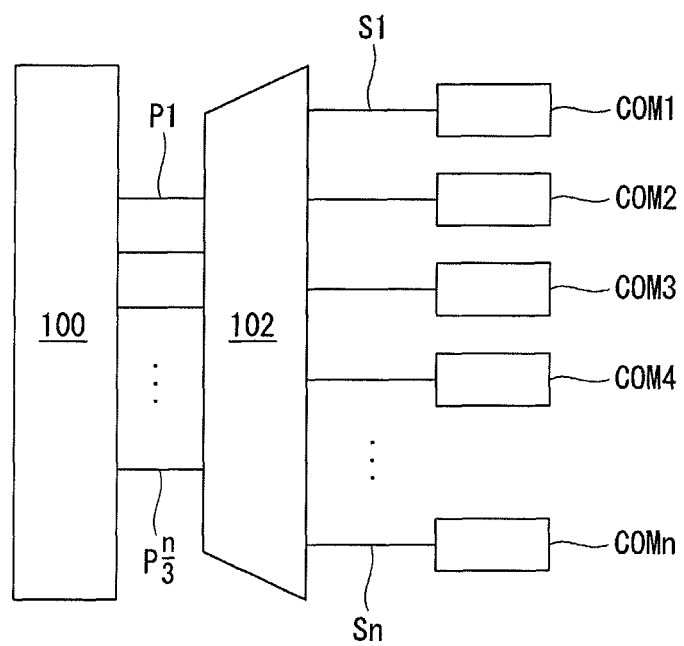
FIG. 11 illustrates a multiplexer installed between a touch sensing circuit and sensing lines.

As shown in FIG. 11, a multiplexer 102 may be installed between the touch sensing circuit 100 and the sensing lines S1 to Sn, so as to reduce the number of input/output pins of the touch sensing circuit 100 in the self-capacitive touch screen TSP. When the multiplexer 102 is implemented as 1:N multiplexer, where N is a positive integer equal to or greater than 2 and less than n, n/N input/output pins of the touch sensing circuit 100, to which the driving signal is output, are connected to input terminals of the multiplexer 102. The n output terminals of the multiplexer 102 are respectively connected to the sensing lines S1 to Sn. Thus, the embodiment of the invention may reduce the number of input/output pins of the touch sensing circuit 100 by 1/N using the multiplexer 102.

When the sensing lines S1 to Sn are divided into three groups, the multiplexer 102 connects n/3 input/output pins P1 to Pn/3 of the touch sensing circuit 100 to the sensing lines of a first group and simultaneously supplies the driving signal to capacitive sensors connected to the sensing lines of the first group. Subsequently, the multiplexer 102 connects the n/3 input/output pins P1 to Pn/3 to the sensing lines of a second group and simultaneously supplies the driving signal to capacitive sensors connected to the sensing lines of the second group. Subsequently, the multiplexer 102 connects the n/3 input/output pins P1 to Pn/3 to the sensing lines of a third group and simultaneously supplies the driving signal to capacitive sensors connected to the sensing lines of the third group. Thus, the touch sensing circuit 100 may supply the driving signal to the n transparent conductive patterns COM1 to COMn through the n/3 input/output pins P1 to Pn/3 using the multiplexer 102.

Figure 12:
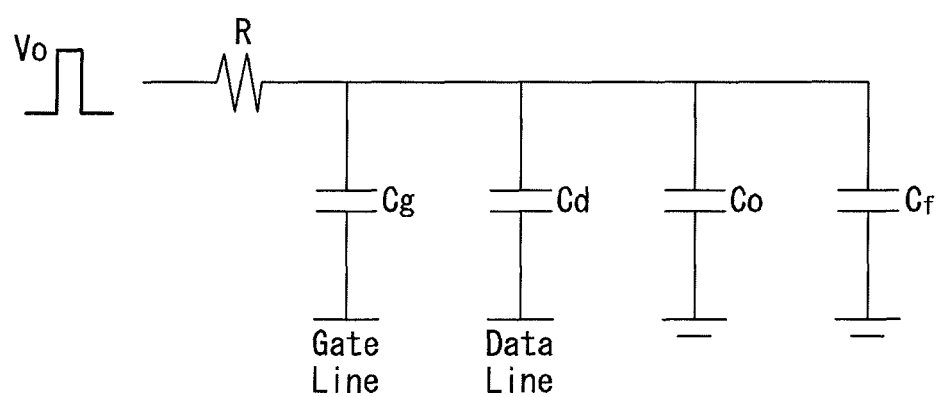
FIG. 12 is an equivalent circuit diagram of a self-capacitive touch screen.
Figure 13:
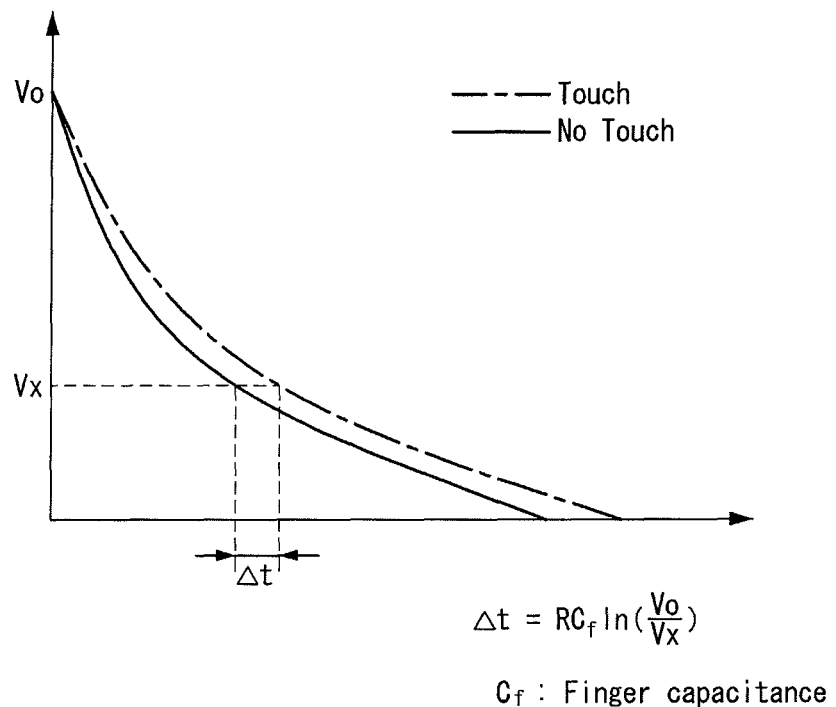
FIG. 13 is a waveform diagram showing a sensing principle of a touch input in a self-capacitive touch screen.

FIG. 12 is an equivalent circuit diagram of the self-capacitive touch screen. FIG. 13 is a waveform diagram showing a sensing principle of a touch input in the self-capacitive touch screen.

As shown in FIGS. 12 and 13, the self-capacitive touch screen TSP includes a resistor R and capacitors Cg, Cd, and Co. The resistor R includes a line resistance and a parasitic resistance of the self-capacitive touch screen TSP and the display panel 10. The capacitor Cg is positioned between the lines of the self-capacitive touch screen TSP and the gate lines 12, and the capacitor Cd is positioned between the lines of the self-capacitive touch screen TSP and the data lines 11. The capacitor Co is positioned between the lines of the self-capacitive touch screen TSP and other components of the display panel 10 except the data lines 11 and the gate lines 12.

When a driving signal Vo is applied to the lines of the self-capacitive touch screen TSP, a rising edge and a falling edge of the driving signal Vo are delayed by an RC delay value determined by the resistor R and the capacitors Cg, Cd, and Co shown in FIG. 12. When a user touches the self-capacitive touch screen TSP with a conductor or his or her finger, the capacitance of the self-capacitive touch screen TSP increases by 'Cf' shown in FIG. 13, and the RC delay further increases. For example, in FIG. 13, the solid line indicates the falling edge of the driving signal Vo when there is no touch input, and the dotted line indicates the falling edge of the driving signal Vo when the touch input is performed. The touch sensing circuit 100 compares a voltage of at least one of the rising edge and the falling edge of the driving signal Vo with a previously determined reference voltage Vx. The touch sensing circuit 100 counts a time required to reach the voltage of at least one of the rising edge and the falling edge of the driving signal Vo to the reference voltage Vx. Reference time information, which is required to reach the voltage of at least one of the rising edge and the falling edge of the driving signal Vo to the reference voltage Vx when there is no touch input, is previously stored in the touch sensing circuit 100. When a difference Δt between a time measured in real time by a counter and the previously known reference time information is equal to or greater than a previously determined threshold value, the touch sensing circuit 100 decides a currently sensed self-capacitance as the touch (or proximity) input.

Figure 16:
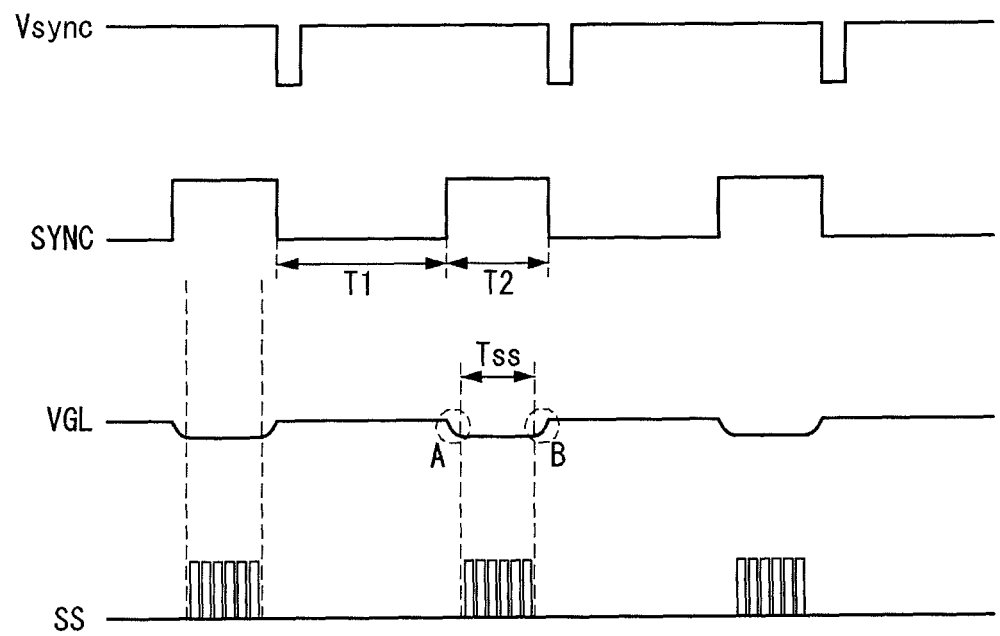
FIG. 16 is a timing diagram of a section showing a small change in a gate low voltage.
Figure 17A:
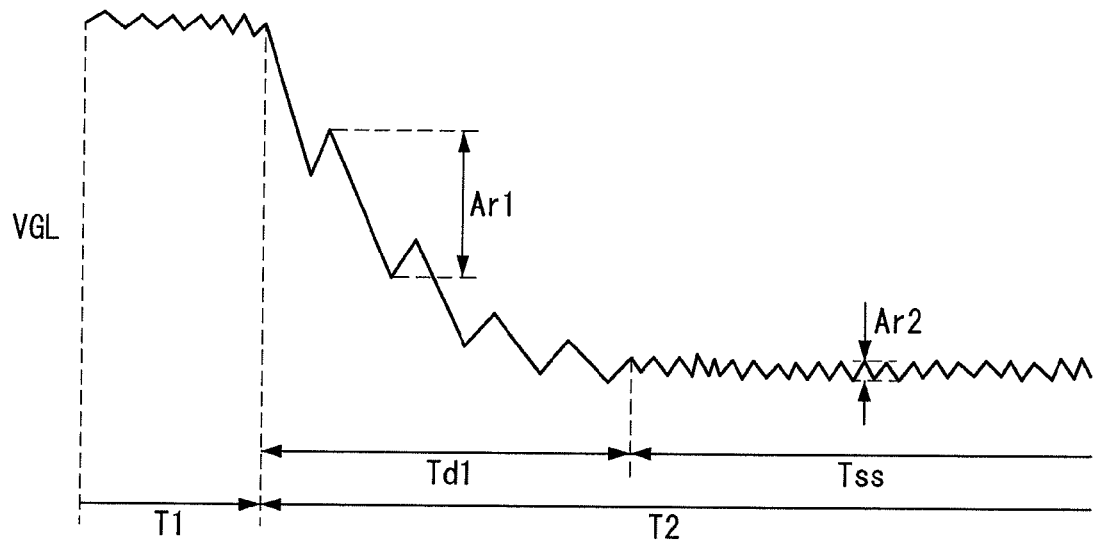
FIG. 17A is a waveform diagram showing in detail a portion "A" of FIG. 16.
Figure 17B:
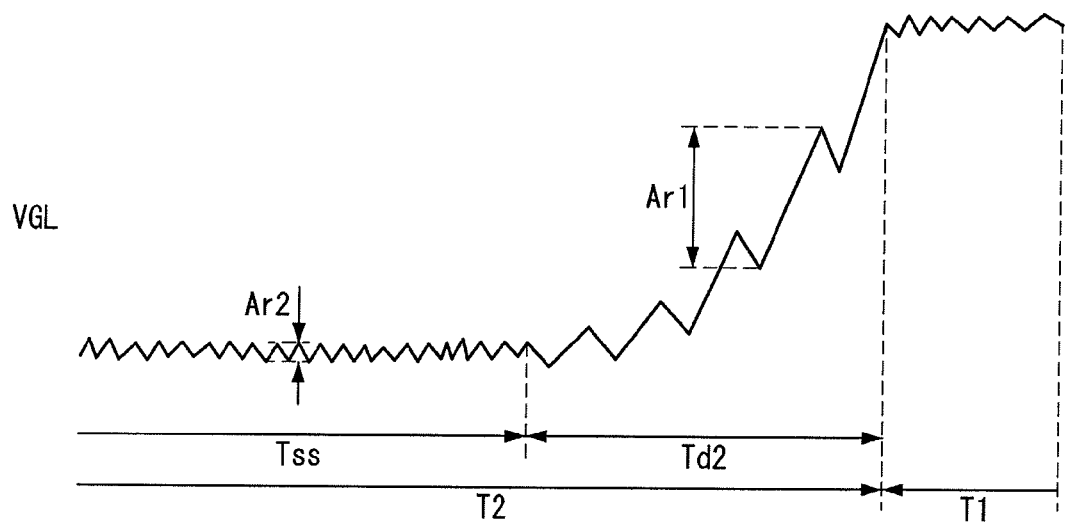
FIG. 17B is a waveform diagram showing in detail a portion "B" of FIG. 16.

The gate pulse, which swings between the gate high voltage VGH and the gate low voltage VGL, is applied to the gate lines 12 of the display panel 10 during the display panel drive period T1. Subsequently, the gate low voltage VGL is continuously applied to the gate lines 12 of the display panel 10 during the touch screen drive period T2. The gate low voltage VGL applied to the gate lines 12 of the display panel 10 may greatly change in a period, which changes from the display panel drive period T1 to the touch screen drive period T2 and vice versa, because of the load difference between the display panel drive period T1 and the touch screen drive period T2. The change of the gate low voltage VGL and an increase in a noise of the sensing voltage of the touch screen TSP resulting from the change of the gate low voltage VGL are proportional to a magnitude of a ripple of the gate low voltage VGL which changes depending on the load change of the display panel 10. As shown in FIGS. 16 to 17B, the embodiment of the invention detects the change of the gate low voltage VGL in the touch screen drive period T2 and applies the driving signal to the lines of the touch screen TSP only in a sensing section Tss, in which the magnitude of the ripple of the gate low voltage VGL decreases, thereby sensing changes in the capacitance of the touch screen TSP. The sensing section Tss exists in the touch screen drive period T2. The sensing section Tss starts at a time which is later than a start time point of the touch screen drive period T2 by a time Td1, and ends at a time which is earlier than an end time point of the touch screen drive period T2 by a time Td2.

Figure 14:
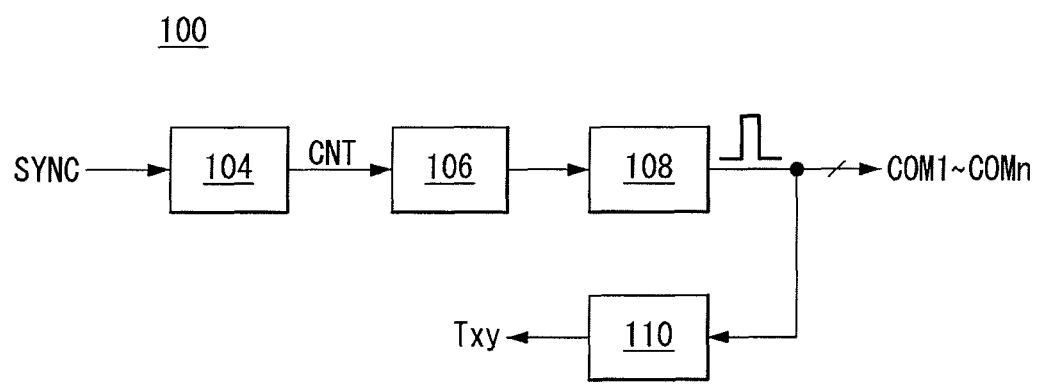
FIG. 14 is a block diagram of a touch sensing circuit according to a first embodiment of the invention.
Figure 15:
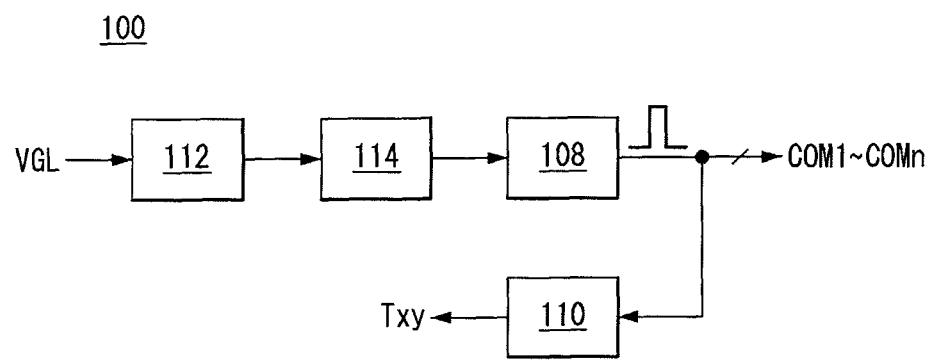
FIG. 15 is a block diagram of a touch sensing circuit according to a second embodiment of the invention.

The touch sensing circuit 100 may detect the sensing section Tss showing the small change in the voltage of the gate line using various methods. FIGS. 14 and 15 illustrate examples of the touch sensing circuit 100 having a detection function of the sensing section Tss.

FIG. 14 is a block diagram of the touch sensing circuit 100 according to a first embodiment of the invention.

As shown in FIG. 14, the touch sensing circuit 100 includes a counter 104, a sensing section detector 106, a driving signal generator 108, and a sensing unit 110.

The counter 104 counts the sync signal SYNC using the clock signals from the start time point of the touch screen drive period T2 and initializes a count value CNT in each frame period. The clock signal may be a clock signal received through the timing controller 22 or a clock signal received from an oscillator connected to the touch sensing circuit 100.

The present inventors repeatedly conducted an experiment and found an optimum sensing time, in which the changes of the gate low voltage VGL are within the previously determined allowable range Ar2 (refer to FIGS. 17A and 17B), in the touch screen drive period T2. The present inventors may previously store informations T2, Td1, and Td2 (refer to FIGS. 17A and 17B) related to the optimum sensing time in a memory of the sensing section detector 106. The sensing section detector 106 compares the count value CNT received from the counter 104 with the time Td1 and decides a time required to reach the count value CNT from the time Td1 to a time T2−(Td1+Td2) as the optimum sensing time. The sensing section detector 106 generates an output (Tss of FIG. 6) generated at a specific logic value during the optimum sensing time.

The driving signal generator 108 generates driving signals only during the sensing section Tss in response to the output of the sensing section detector 106 and supplies the driving signals to the lines of the touch screen TSP. The sensing unit 110 senses the changes in the capacitance of the touch screen TSP in synchronization with the driving signals and generates touch raw data Txy based on the sensing result.

FIG. 15 is a block diagram of the touch sensing circuit 100 according to a second embodiment of the invention.

As shown in FIG. 15, the touch sensing circuit 100 includes a voltage detector 112, a sensing section detector 114, a driving signal generator 108, and a sensing unit 110.

The voltage detector 112 measures the voltage of the gate line 12 during the touch screen drive period T2.

The present inventors repeatedly conducted an experiment and previously stored the voltage of the gate line 12 measured in an optimum sensing time of the touch screen drive period T2, in which a noise is slightly generated in the touch screen TSP, in a memory of the sensing section detector 114 as a reference value. The sensing section detector 114 compares the voltage of the gate line 12 received from the voltage detector 112 with the previously stored reference value and decides a period, in which a difference is within the previously determined allowable range Ar2 (refer to FIGS. 17A and 17B), as an optimum sensing time. The sensing section detector 114 generates an output (Tss of FIG. 6) generated at a specific logic value during the optimum sensing time.

The driving signal generator 108 generates driving signals only during the sensing section Tss in response to the output of the sensing section detector 114 and supplies the driving signals to the lines of the touch screen TSP. The sensing unit 110 senses the changes in the capacitance of the touch screen TSP in synchronization with the driving signals and generates touch raw data Txy based on the sensing result.

FIG. 16 is a timing diagram of a section showing a small change in the gate low voltage. FIG. 17A is a waveform diagram showing in detail a portion "A" of FIG. 16. FIG. 17B is a waveform diagram showing in detail a portion "B" of FIG. 16.

As shown in FIGS. 16 to 17B, the gate low voltage VGL, which is the DC voltage, is applied to the gate lines 12 during the touch screen drive period T2.

During a transition period Td1 from the display panel drive period T1 to the touch screen drive period T2, the load of the display panel 10 is sharply reduced. On the contrary, during a transition period Td2 from the touch screen drive period T2 to the display panel drive period T1, the load of the display panel 10 is sharply increased. Thus, when about −10V is applied to the gate lines 12 during the touch screen drive period T2, the gate low voltage VGL measured in the gate lines 12 during the first and second transition periods Td1 and Td2 greatly changes between about −10V and a ground level voltage GND and includes a high ripple Ar1. The ripple Ar1 of the voltage measured in the gate lines 12 during the first and second transition periods Td1 and Td2 is greater than a ripple Ar2 of the voltage measured in the gate lines 12 during the sensing section Tss.

On the other hand, the load of the display panel 10 hardly changes during the sensing section Tss ranging from a time, at which the first transition period Td1 has passed from a start time point of the touch screen drive period T2, to a time, which is advanced from an end time point of the touch screen drive period T2 by the second transition period Td2. Because of this, the voltage measured in the gate lines 12 during the sensing section Tss changes around about −8V with the small ripple Ar2 and thus is measured as a current voltage which hardly changes. The ripple Ar2 of the voltage measured in the gate lines 12 during the sensing section Tss is much less than the ripple Ar1 of the voltage measured in the gate lines 12 during the first and second transition periods Td1 and Td2. Thus, the touch sensing circuit 100 applies driving signals SS to the lines of the touch screen TSP only during the sensing section Tss of the touch screen drive period T2, in which the voltage of the gate lines 12 hardly changes, thereby sensing changes in the capacitance of the touch screen TSP.

The touch screen according to the embodiment of the invention is not limited to the in-cell type touch screen. For example, the touch sensing circuit 100 shown in FIGS. 14 to 17B and the method for driving the same may be applied to the various types of touch screens shown in FIGS. 1 to 3.

As described above, the embodiment of the invention detects the optimum sensing time, in which the changes in the voltage of the gate lines are within the previously determined allowable range, in the touch screen drive period, in which data is not written to the pixels of the display panel, and supplies the driving signals to the lines of the touch screen only in the optimum sensing time. As a result, the embodiment of the invention may reduce the noise of the voltage sensed from the touch screen resulting from the changes in the voltage of the gate lines of the display panel and increase the sensing sensitivity of the touch screen.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing display device comprising:
a touch screen integrated with a display panel including data lines, gate lines crossing the data lines, touch electrodes for sensing a touch input, and pixels arranged in a matrix form at crossings of the gate lines and the data lines, the gate lines separate and disconnected from the touch electrodes; and
a touch sensing circuit configured to operate in a display mode or a touch mode according to a control signal, the control signal including a first period in which the control signal is at a first level indicative of the display mode and a second period in which the control signal is at second level indicative of the touch mode, wherein:
a common voltage is supplied to all the touch electrodes to display an image on the pixels during the first period of the control signal in which the control signal is at the first level;
the touch sensing circuit does not supply a touch driving signal to any of the touch electrodes during a first part of the second period of the control signal, the first part of the second period of the control signal immediately following the first period of the control signal and a ripple of voltage on the gate lines being outside a predetermined range in the first part of the second period of the control signal; and
the touch sensing circuit supplies the touch driving signal to one or more of the touch electrodes during a second part of the second period of the control signal, the second part of the second period of the control signal being subsequent to the first part of the second period of the control signal and the ripple of the voltage on the gate lines being within the predetermined range in the second part of the second period of the control signal, touch sensing signals from the one or more touch electrodes responsive to the touch drive signal being used to detect the touch input.

2. The touch sensing display device of claim 1, further comprising a controller configured to time-divide one frame period into a display panel during the first period of the control signal and to not write data to the pixels of the display panel during the second period of the control signal.

3. The touch sensing display device of claim 2, wherein the touch sensing circuit does not supply the touch driving signal to any of the touch electrodes during a third part of the second period of the control signal, the third part of the second of the control signal being subsequent to the second part of the second period of the control signal and immediately preceding another first period of the control signal of a subsequent frame, and the ripple of the voltage on the gate lines being outside the predetermined range in the third part of the second period of the control signal.

4. The touch sensing display device of claim 3, wherein the ripple of a voltage measured at the gate lines during the second part of the second period of the control signal is less than a ripple of a voltage measured at the gate lines during the first part and the third part of the second period of the control signal.

5. The touch sensing display device of claim 3, wherein the voltage at the gate lines is lowered from a first level to a second level during the first part of the second period of the control signal.

6. The touch sensing display device of claim 5, wherein the voltage at the gate lines is increased from the second level to the first level during the third part of the second period of the control signal.

7. A method for driving a touch sensing display device including a touch screen integrated with a display panel including data lines, gate lines crossing the data lines, touch electrodes for sensing a touch input, and pixels arranged in a matrix form at crossing of the gate lines and the data lines, the gate lines separate and disconnected from the touch electrodes, the touch sensing display device operated in a display mode or a touch mode according to a control signal, the control signal including a first period in which the control signal is at a first level indicative of the touch mode, the method comprising:
   supplying a common voltage to all the touch electrodes to display an image on the pixels during the first period of the control signal in which the control signal is at the first level;
   not supplying a touch driving signal to any of the touch electrodes during a first part of the second period of the control signal, the first part of the second period of the control signal immediately following the first period of the control signal and a ripple of voltage on the gate lines being outside a predetermined range in the first part of the second period of the control signal; and
   supplying the touch driving signal to one or more of the touch electrodes during a second part of the second period of the control signal, the second part of the second period of the control signal being subsequent to the first part of the second period of the control signal and the ripple of the voltage on the gate lines being within the predetermined range in the second part of the second period of the control signal, touch sensing signals from the one or more touch electrodes responsive to the touch drive signal being used to detect the touch input.

8. The method of claim 7, further comprising:
   not supplying the touch driving signal to any of the touch electrodes during a third part of the second period of the control signal, the third part of the second period of the control signal being subsequent to the second part of the second period of the control signal and immediately preceding another first period of the control signal of a subsequent frame, and the ripple of the voltage on the gate lines being outside the predetermined range in the third part of the second period of the control signal.

9. The method of claim 8, wherein a ripple of a voltage measured in the gate lines during the second part of the second period of the control signal is less than a ripple of a voltage measured in the gate lines during the first part and the third part of the second period of the control signal.

10. The method of claim 7,
   wherein data is written, to the pixels of the display panel during the first period of the control signal, and
   wherein data is not written to the pixels of the display panel during the second period of the control signal.

11. The method of claim 8, wherein the voltage at the gate lines is lowered from a first level to a second level during the first part of the second period of the control signal.

12. The method of claim 11, wherein the voltage at the gate lines is increased from the second level to the first level during the third part of the second period of the control signal.

13. A driver circuit for driving a touch sensing display device including a touch screen integrated with a display panel including data lines, gate lines crossing the data lines, touch electrodes for sensing a touch input, and pixels arranged in a matrix form at crossings of the gate lines and the data lines, the gate lines separate and disconnected from the touch electrodes, the touch sensing display device operated in a display mode or a touch mode according to a control signal, the control signal including a first period in which the control signal is at a first level indicative of the display mode and a second period in which the control signal is at a second level indicative of the touch mode,
   the driver circuit comprising circuitry to supply a common voltage or a touch driving signal, wherein:
   the circuitry supplies the common voltage to all the touch electrodes to display an image on the pixels during the first period of the control signal in which the control signal is at the first level;
   the circuitry does not supply the touch driving signal to any of the touch electrodes during a first part of the second period of the control signal, the first part of the second period of the control signal immediately following the first period of the control signal and a ripple of voltage on the gate lines being outside a predetermined range in the first part of the second period of the control signal; and
   the circuitry supplies the touch driving signal to one or more of the touch electrodes during a second part of the second period of the control signal, the second part of the second period of the control signal being subsequent to the first part of the second period of the control signal and the ripple of the voltage on the gate lines being within the predetermined range in the second part of the second period of the control signal, touch sensing signals from the one or more touch electrodes responsive to the touch drive signal being used to detect the touch input.

14. The driver circuit of claim 13,
   wherein the circuitry does not supply the touch driving signal to any of the touch electrodes during a third part of the second period of the control signal, the third part of the second period of the control signal being subsequent to the second part of the second period of the control signal and immediately preceding another first period of the control signal of a subsequent frame, and the ripple of the voltage on the gate lines being outside the predetermined range in the third part of the second period of the control signal.

15. The driver circuit of claim 14, wherein the ripple of the voltage measured at the gate lines during the second part of the second period of the control signal is less than the ripple of the voltage measured at the gate lines during the first part and the third part of the second period of the control signal.

16. The driver circuit of claim 13,
wherein data is written to the pixels of the display panel during the first period of the control signal, and
wherein data is not written to the pixels of the display panel during the second period of the control signal.

17. The driver circuit of claim 14, wherein the voltage at the gate lines is lowered from a first level to a second level during the first part of the second period of the control signal.

18. The driver circuit of claim 17, wherein the voltage at the gate lines is increased from the second level to the first level during the third part of the second period of the control signal.

* * * * *